Nov. 26, 1940.

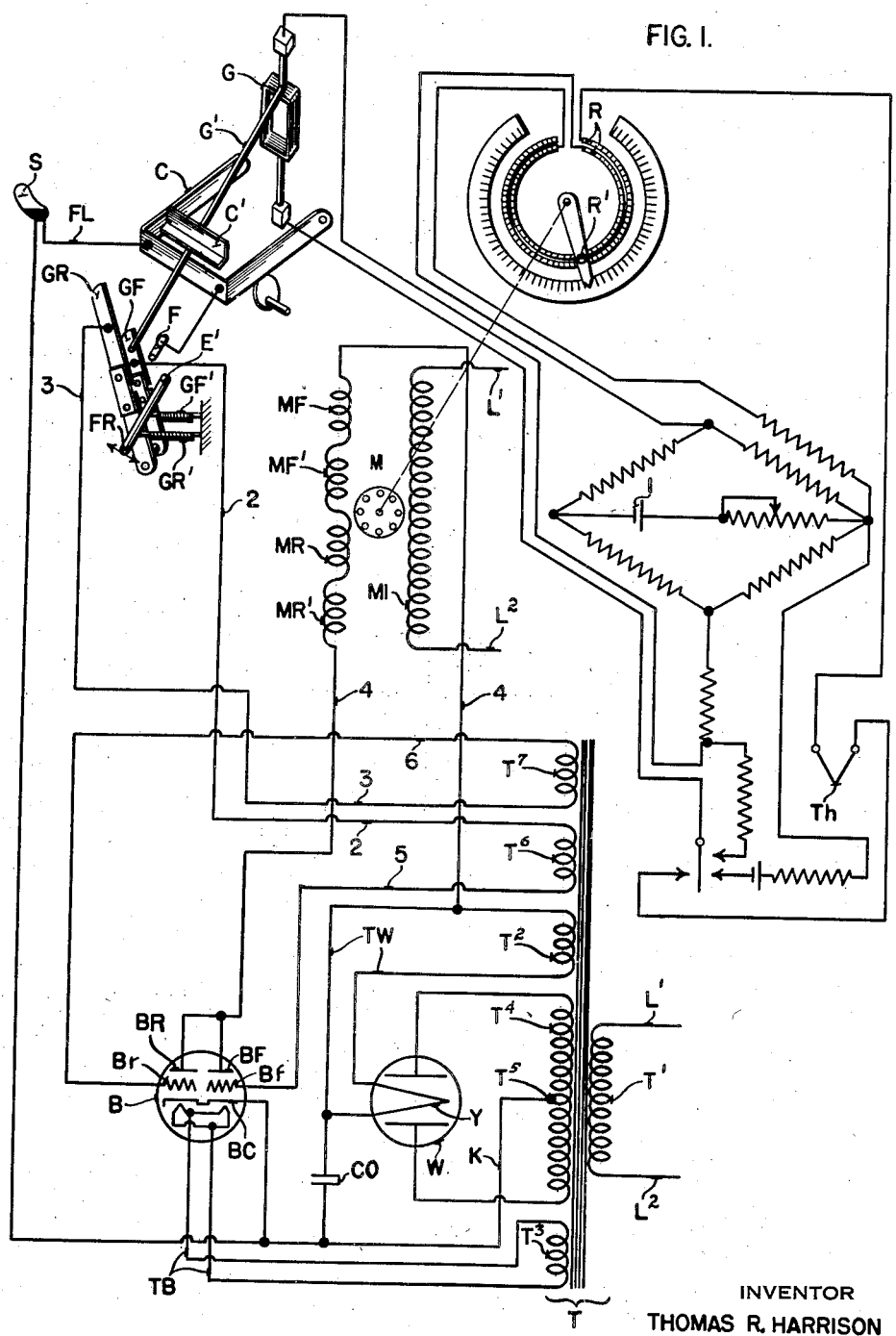

T. R. HARRISON 2,222,947

CONTROL SYSTEM

Original Filed Jan. 9, 1937      2 Sheets-Sheet 2

INVENTOR
THOMAS R. HARRISON
BY *George M. [signature]*
ATTORNEY

Patented Nov. 26, 1940

2,222,947

UNITED STATES PATENT OFFICE 2,222,947

CONTROL SYSTEM

Thomas R. Harrison, Wyncote, Pa., assignor to The Brown Instrument Company, Philadelphia, Pa., a corporation of Pennsylvania Original application January 9, 1937, Serial No. 119,761. Divided and this application May 24, 1939, Serial No. 275,505

4 Claims. (Cl. 172—278)

The general object of the present invention is to provide an improved apparatus for producing control effects in accordance with the variations in a variable condition, such as a variable temperature, rate of flow or pressure. The present invention may be employed with advantage in producing control effects for such purposes as the power, or relay, adjustment of the indicating pointer or recording pen of a measuring instrument in accordance with the deflection of a sensitive measuring unit, the control of a fuel valve or switch, the actuation of distant reading instruments, remote control operations, and for many other purposes in which a power actuated device or relay is operated in accordance with changes in the value of a variable condition.

In accordance with the present invention, I create control effects which are of fixed predetermined magnitude and create opposing control effects, each equal to, less than, or greater than a corresponding one of the first mentioned effects, accordingly as the variable condition is equal to, or differs in one direction or the other from a corresponding one of the first mentioned effects. In my prior application, Ser. No. 119,761, filed Jan. 9, 1937, of which the present application is a division, I have disclosed various forms of apparatus, including those illustrated and described herein, for creating control effects of the character just described, and for utilizing those effects in controlling reversible electric motors of various types.

The general principles of the invention disclosed in my said prior application are of especial advantage when utilized, as disclosed and claimed herein, in controlling a reversible electric relay motor of a known type which is adapted to operate in one direction, or the other, or to stall, accordingly as one or the other of two energizing actions is impressed on the motor or both energizing actions are simultaneously impressed thereon. The use of such a motor for control purposes avoids the motor overrunning or coasting, experienced when the energization of a motor of more usual type is interrupted.

The use of such a motor controlled in the manner disclosed herein, is especially advantageous for example, when used in a self-balancing potentiometer instrument to adjust the slide wire resistance and pen carriage of the instrument, in accordance with the deflection of the galvanometer connected to the potentiometer circuit. In such potentiometric uses of the invention, the galvanometer actuating current is ordinarily minute, and the galvanometer deflection impulse correspondingly small, and the galvanometer actuating current or a minute controlling current regulated by the galvanometer, may advantageously be amplified for the purposes of the present invention by the use of electronic amplifying means.

The various features of novelty which characterize my invention are pointed out with particularity in the claims annexed to and forming a part of this specification. For a better understanding of the invention, however, its advantages and specific objects attained with its use, reference should be made to the accompanying drawings and descriptive matter in which I have illustrated and described preferred embodiments of the invention.

Of the drawings:

Fig. 1 is a diagrammatic representation of one embodiment of my invention;

Figure 3:
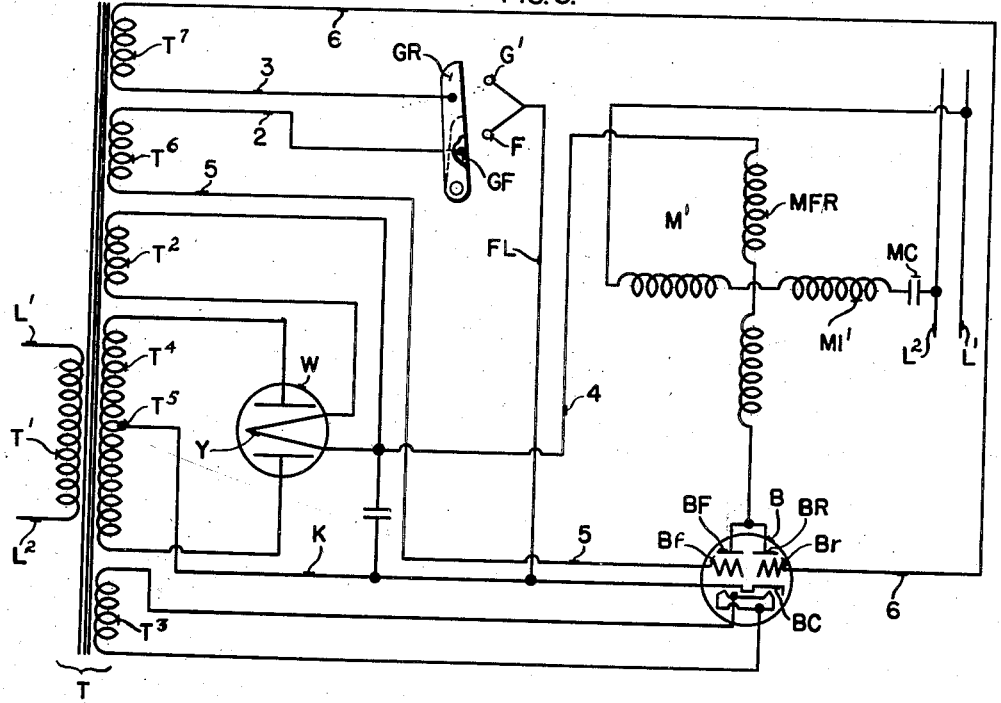
Fig. 3 is a diagram illustrating a modification of a portion of the motor circuit arrangement shown in Fig. 1.

In the form of the invention diagrammatically illustrated in Fig. 1, a galvanometer G having a pointer G' is adapted to respond to unbalance in a null point potentiometric circuit, the latter of which may be of any suitable type, such as the Brown potentiometric circuit disclosed in my prior Patent 1,898,124 issued February 21, 1933. Such circuits are well-known, and it is sufficient for the present purposes to note that the circuit shown comprises a circuit branch including a source of variable potential to be measured, such for example, as the thermocouple $Th$, an opposing circuit branch including a source of known potential such as the cell 1, and resistors R, a variable portion of the last of which may be connected into the opposed branches by means of a sliding contact R' whereby the respective effects of the variable and known sources are made equal and opposite, and the galvanometer is thus brought into its neutral undeflected position, when the circuit is balanced for a given value of the E. M. F. of the thermocouple $Th$ with contact R' in a corresponding position. The position of contact R' along the resistors R is then a measure of the value of the thermocouple E. M. F., and may then serve as a measure of the temperature to which it is exposed.

In the form of my invention shown in Fig. 1, the contact R' is adjusted back and forth along resistors R in response to galvanometer deflection, by means comprising a reversible electrical motor M connected to contact R' for rotation of the latter, when the motor is rotated, and galvanometer contacting means for selectively energizing the motor M in one direction or the other and for a period depending upon the direction and extent of galvanometer deflection. The motor M is of the split phase shading pole induction variety, having a main field winding MI energized directly from alternating current supply conductors $L^1$ and $L^2$ and shading field windings MF, $MF^1$, MR and $MR^1$.

The galvanometer contacting, or controlled, means includes a pair of arms GF and GR which are given oscillatory motion in regular cycles from an initial position into a final position during which movement, the arm GR is adapted to engage the pointer G' and the arm GF is adapted to engage a fixed stud F. The travel of arm GF is thus fixed, the arm GF moving in each cycle from a fixed initial position to the position in which it contacts stud F, but the travel of arm GR is variable, the arm GR moving in each cycle from a fixed initial position corresponding to the initial position of arm GF, to a position in which it contacts the galvanometer pointer G'. Arms GF and GR are urged by means of spring GF' and GR' in a direction to make contact respectively with members F and G', and are permitted to do so, or are prevented from doing so by an oscillating actuating pin E', which once in each cycle carries both arms GF and GR in the counterclockwise direction to an initial position, and permits the arms thereafter to turn clockwise toward engagement with members F and G'.

The pointer G', which is made of electrically conducting material, is periodically clamped by means of a clamp C against an abutment C'. The stud F and clamp C are electrically connected together and are connected by a conductor FL into a motor energizing and control circuit to which the arms GF and GR are connected by conductors 2 and 3, respectively, and to which the shading field windings MF, $MF^1$, MR and $MR^1$ of the motor M are also connected. The motor energizing and control circuit shown in Fig. 1 is hereinafter described in detail, but at this point I note that it is of such character that the engagement of the arm GF with the stud F, while the arm GR is out of engagement with the pointer G', energizes the shading field windings for rotation of the motor M in one direction, and that the engagement of the arm GR with the pointer G', with the arm GF out of contact with the stud F, energizes the shading field windings for rotation of the motor M in the reverse direction, and that the simultaneous engagement of the arms GF and GR with the stud F and pointer G', respectively, energizes the shading field windings to stall the motor M.

In order to selectively energize motor M for rotation in one direction or the other dependent upon the direction of deflection of pointer G' from its mid or null position and to make the extent of rotation of the motor proportional to the extent of deflection of the galvanometer, the fixed stud F is arranged to be contacted by arm GF at the mid point in the oscillatory travel of arms GF and GR, at which point the galvanometer pointer G' will also be contacted, while clamped, by arm GR, if at that time the galvanometer is in its null position. Under such conditions the shading fields of motor M will be so energized that no rotation of the motor will result. Subsequently rod E' will pick up both arms together, and the circuit may be arranged so that the shading fields of motor M are thereby deenergized but preferably as hereinafter described, independent interruptor means are provided for deenergizing the motor.

If the galvanometer when clamped is deflected to the right as seen in Fig. 1, the counterclockwise movement of arms GF and GR will result in engagement of arm GF with stud F before arm GR contacts pointer G'. Such independent engagement of arm GF with stud F will result in energization of the shading field windings MF, $MF^1$, MR and $MR^1$ for rotation of the motor M in one direction. The rotation of motor M will continue until the arm GR contacts pointer G', thereby energizing the shading field windings to stall the motor. If the galvanometer, when clamped, is deflected to the left, the counterclockwise rotation of arms GF and GR will first bring the arm GR into contact with the pointer G' thereby energizing the shading field windings for a rotation of the motor M in the reverse direction, which will be terminated by engagement of arm GF with the stud F, whereby the shading field windings are so energized as to stall the motor. As will be understood, the rotation of motor M will move contact R' in a direction to restore the galvanometer pointer G' to its null position.

It will be noted that in view of the cyclic character of the operation, the period of energization of motor M in one direction or the other may be, and as shown is, made proportional to the extent of deflection of pointer G'. The device, as thus far described, may be utilized to provide two energizing periods for motor M, each proportional to the extent of deflection. Thus the element E' in turning counterclockwise during a left-hand deflection of pointer G' will pick up arm GF and may thereby effectively energize the motor shading field windings to rotate the motor in one direction until element E' subsequently picks up arm GR and thereby effectively deenergizes the field windings. Similarly on a right-hand deflection element E' may first pick up arm GR and thereby energize the shading field windings for rotation of the motor in the reverse direction until arm GF is picked up by element E' and the shading fields are effectively deenergized.

In practice, however, it is desirable that the motor fields MF, $MF^1$, MR and $MR^1$ should be deenergized throughout the periods in which either arm GF or GR is being returned to its initial position by the element E'. To this end I provide an interruptor switch S whereby the circuit for motor M is opened at the end of the first half of the cycle before either arm GF or GR is picked up by element E', and remains open during substantially the entire counterclockwise movement of element E'.

Figure 2:
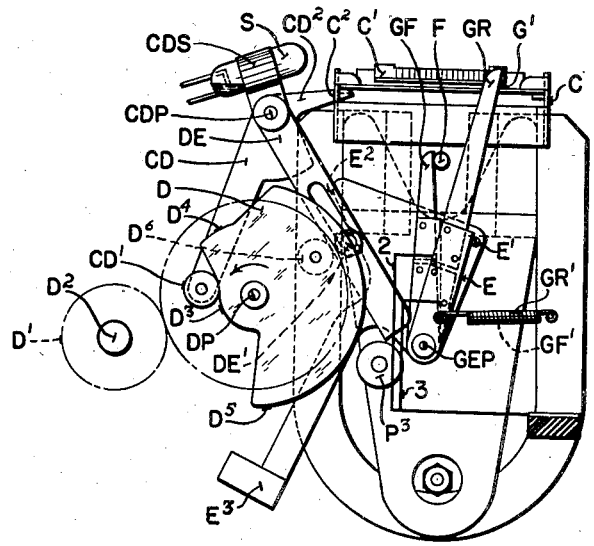
Fig. 2 is a diagrammatic elevation of apparatus shown in part in Fig. 1.

Fig. 2 diagrammatically illustrates the form of mechanism for producing the oscillatory movements of the arms GF and GR, in suitably timed relation with the clamping of the galvanometer pointer G' against the abutment C'. Said mechanism comprises a cam D journalled at DP and continuously rotated through gearing D' by a shaft $D^2$ which is driven by a motor, not shown. The cam D is provided with an edge configured to provide edge segments $D^3$, $D^4$ and $D^5$, and is rotated counterclockwise. A roller CD' carried by a lever CD which is pivoted on CDP, and has a gravitational bias for counterclockwise movement, whereby the roller CD' is held in engagement with the edge of the cam D.

As shown in Fig. 2, the roller CD' is in engagement with the cam edge portion $D^3$, and the lever CD is at the limit of its movement in the counterclockwise direction, and its arm CD² extends through a slot C² in the pivoted clamping member C, and holds the clamping edge of said member in an elevated position in which it engages the galvanometer pointer G' and clamps the latter against the stationary abutment C'.

The lever CD carries a switch bracket CDS for the mercury switch S, and when the lever CD is moved in the position shown in Fig. 2, the switch S is tilted into its closed circuit position. As the continuous rotation of the cam D in the counterclockwise direction terminates the engagement of the roller CD' with the cam edge portion D³ and effects engagement of the roller CD' first with the cam edge portion D⁴ and then with the cam edge portion D⁵, the clamp C is permitted to move down under the action of gravity thus releasing the galvanometer pointer G', and the switch S is turned to its open position.

The operating means for the element E' whereby the oscillation of arms GR and GF is controlled, includes a roller D⁶, carried by cam D, and displaced from the axis of rotation of the latter, which engages the edge of a lever DE. The latter is loosely pivoted at CDP, and carries a pin DE' adapted to engage the cam surface E² of a lever E. Lever E is loosely pivoted at GEP, which is also the pivot for levers GF and GR, and carries the previously mentioned element E'. The lever E is given a counterclockwise bias by counterweight E³, which is sufficient to overcome the force of springs GR' and GF'', so that edge E² exerts a force on pin DE' tending to turn lever DE into engagement with roller D⁶. Movement of lever E counterclockwise is limited by its engagement with stationary stud P³. As the roller D⁶ turns into the position shown in Fig. 2, it turns the lever DE counterclockwise, and thereby turns the lever E clockwise and thus permits arms GR and GF to move clockwise into engagement with the pointer G¹ and pin F, respectively.

In Fig. 2, the arms GR and GF are shown at the limits of their movements in the clockwise direction, and it will be noted that the roller D⁶ is then in its dead center or tangential position with respect to the edge of lever DE, and the roller CD¹ is about to leave edge segment D³ and will shortly thereafter be engaged by edge D⁴, before pin E' has permitted any appreciable movement of arms GR and GF to the left. The switch S is moved to open position, as the arms GR and GF turning counterclockwise are restored to their initial positions, and thus opens the motor energizing circuit, preventing operation of the latter during the movement of the arms GR and GF to the left, and also obviates any circuit opening action at the galvanometer pointer or at the stud F, which might result in objectionable arcing. Conceivably, the dwell D⁴ might be dispensed with but when provided, it insures positive tilting of switch S to its off position before the arms GR and GF leave the pointer G¹ and stud F, respectively, and insures further that the arms GR and GF are returned to their furthermost position in the counterclockwise direction before the clamp C releases the pointer G'.

The galvanometer zero is set at the mid point of the abutment C' which may be graduated with divisional markings to indicate the galvanometer position, and the edge of stud F which is contacted by arm GF is disposed directly under the edge of the pointer contacted by arm GR whereby simultaneous engagement of the arms with their respective contacting element may be effected when the galvanometer is in zero position. The pin DE' as shown is adjustable radially of the axis of pivot CDP to govern the travel of arm GF and GR. Switch S is preferably arranged for angular adjustment about pivot CDP, as, for example, by providing a frictional engagement between lever CD and bracket CDS, permitting manual relative movement of those parts, but insuring that the bracket CDS normally moves with the lever CD.

The potentiometer shown in Fig. 1 is rebalanced as the result of movements given the contact R' along the resistors R by the motor M. As the galvanometer pointer is deflected in one direction or the other, and the arms GR and GF make engagement with their respective contacting elements, the motor M is energized for rotation in one direction or the other for a period depending upon the direction and extent of galvanometer deflection, and moves the contact R' to a new position along the slide wire resistances R to produce an effect in the potentiometric circuit equal and opposite to that which gave rise to the galvanometer deflection.

The energizing circuit for the motor M shown in Fig. 1, includes a twin amplifier tube B such as a tube of the "53", heated cathode type, combining in one envelope two triodes, comprising anodes or plates BF and BR, grids Bf and Br, and filament means for heating a common cathode BC. Necessary direct current voltages are obtained from a standard rectifier arrangement including a rectifier tube W, a power supply transformer T and a filter condenser CO. The rectifier W may be any suitable full wave rectifier, such as an "80" type tube, adapted for use in direct current power supply devices which operate from an alternating current supply line. The transformer T, as shown, includes a primary winding T' connected to the alternating current supply conductors L¹ and L², and wound on a common core with secondary windings T², T³, T⁴, T⁶ and T⁷.

The windings T² and T³ are filament heater windings and through conductors TW and TB supply filament current to the tubes W and B, respectively. Connection is made by a conductor K to the cathode BC of tube B, from a center tap T⁵ on the winding T⁴. The terminals of the winding T⁴ are connected to the plates of the rectifier tube W and the electronic circuit is completed through the triodes of tube B, and conductor 4, in which the motor shading field windings MF, MF¹, MR and MR¹ are inserted, to the filament Y of rectifier tube W, and through the rectifier tube W back to the winding T⁴.

A direct current charge is maintained across the filter condenser CO due to the rectification of the alternating voltage across both halves of the winding T⁴. Because of the rectifying action of tube W, current flows through the conductor K in one direction only thereby setting up the direct current charge across the condenser CO. By assigning suitable values to the various elements of the rectifier circuit a difference of potential suitable for supplying operating voltage to the tube B may be obtained.

The characteristics of the tube B are such that with its grids Bf and Br at zero potential with respect to the cathode BC, the plate currents through the tube will be reduced to a negligible value. When a voltage or signal is applied to either grid Bf or Br, however, current of substantial value will flow in the corresponding plate circuit during the positive half of the grid voltage cycle. During the negative half of the grid voltage cycle the current in the corresponding plate circuit will be reduced to zero. Since the tube B will be conductive only during the positive half of the grid voltage cycle, the plate current flowing will, therefore, be pulsating having the frequency of the alternating current impressed on the grid.

As shown in Fig. 1, the windings MF, MF¹, MR and MR¹ are connected in series with the plate to cathode resistances of the triodes of tube B, and are energized for selectively producing motor rotation in one direction or the other by applying to these windings a pulsating current having the same frequency as the alternating current supplied by conductors L¹ and L² and in phase or 180° out of phase therewith. The motor is stalled by applying both of said pulsating currents simultaneously on said motor.

The main field winding MI is energized directly from the line, but is of such high inductance that the current through this winding lags the line voltage by approximately 90°. The tube B, acting as a resistance, tends to keep the current in the shading field windings approximately in phase with the line voltage so that in effect the motor M is operated as a split phase motor for rotation in one direction or the other as the current through the shading field windings is selectively controlled. If desired a condenser of suitable capacity may be connected across the terminals of the auxiliary windings for holding the current through these windings more closely to the desired phase angle, and for transforming the pulsating current produced by the tube B into current of more nearly sinusoidal form.

As shown, the arms GF and GR cooperate with pointer G' and pin F to selectively energize the grids Bf and Br of tube B. The pointer G' and pin F are connected by a conductor FL to the cathode BC, and the arm GF is connected by the conductor 2 to one terminal of the secondary winding T⁶, and the arm GR is connected by the conductor 3 to one terminal of the secondary winding T⁷. The second terminal of the winding T⁶ is connected by a conductor 5 to the grid Bf of the tube B and the second terminal of the winding T⁷ is connected by a conductor 6 to the grid Br of the tube B. Furthermore, the connections are such that when the arm GF engages the stud F, the varying potential bias impressed on the grid Bf is 180° out of phase with the potential bias impressed on the grid Br when the arm GR engages the galvanometer pointer G'.

When the arm GF engages stud F before the arm GR engages the galvanometer pointer G', the potential bias impressed on the grid Bf will create a pulsating current flow through the shading field motor windings MF, MF¹, MR and MR¹ which will be displaced in phase from the current flow in the winding MI by approximately 90° and as a result a rotating magnetic field will be established in the motor to produce rotation of the motor rotor in a predetermined direction. When the arm GR engages the galvanometer pointer G' before the arm GF engages the stud F, the potential bias impressed on the grid Br will create a pulsating current flow through the shading field windings which will be displaced approximately 90° from the current flow in the winding MI, but the direction of the phase displacement of the currents in the two windings will be opposite to that in the first mentioned case. With either direction of the phase displacement of the current flow in the shading field windings MF, MF¹ and MR, and MR¹ relative to that in the main field winding MI, the two current flows will subject the rotor of the motor to a magnetic field rotating in a direction selectively dependent upon the direction of said phase displacement to produce a rotor rotation in the same direction in which the magnetic field rotates.

When in the clockwise movement of levers GF and GR the galvanometer pointer G' is deflected to a position left of its normal balanced position, lever GR will engage the pointer G' before lever GF makes engagement with the pin F. Thereupon an alternating potential will be applied to the grid Br, and pulsating direct current will flow in the plate circuit including plate BR. When the lever GF subsequently makes engagement with the pin F an alternating potential will be applied to the grid Bf and the other triode in the tube B will also become conductive. Thereupon pulsating plate current will also flow in the plate circuit including the plate BF, but this pulsating current will be displaced 180° in phase from that flowing in the plate circuit including the plate BR. If in the clockwise movement of the levers GF and GR, the galvanometer pointer G¹ is deflected to the right, the lever GF will contact pin F first and the plate circuit including the plate BF will become effectively conductive before the plate circuit including the plate BR becomes similarly conductive.

In operation, during each period in which the arm GR is in engagement with the galvanometer pointer G' and the arm GF is approaching, but has not yet engaged the stud F, a potential bias or signal will be impressed on the grid Br, with the result of creating an amplified current flow in the motor shading field windings which is displaced approximately 90° from the current flow in the winding MI. The two current flows will subject the rotor of the motor M to the action of a magnetic field rotating in a predetermined direction. Similarly, when the arm GF is in engagement with the stud F and the arm GR is moving clockwise toward, but has not yet engaged the galvanometer pointer G', a signal or potential bias will be impressed on the grid Bf, with the result that an amplified current will flow in the shading field windings which is displaced approximately 90° in the opposite direction from the current flow in the main field winding and these two current flows will subject the rotor of the motor M to a magnetic field rotating in the opposite direction. The rotation in either direction of the magnetic field acting on the motor rotor, will cause the latter to rotate in a corresponding direction.

With the interrupter switch closed and the arms GF and GR in engagement with the stud F and pointer G', respectively, each of the grids Bf and Br is given a potential bias and both plate circuits of the tube B are rendered conductive, with the result that two pulsating currents displaced 180° flow through the shading field windings and urge the motor to rotation in both directions simultaneously whereby the motor is held stationary.

The means shown in Figs. 1 and 2 for selectively impressing control signals on the biasing grids of the twin, or double triode, tube B, may be used with advantage in an induction motor energizing circuit arrangement different from that shown in Fig. 1, one such different arrangement being shown by way of example in Fig. 3.

The induction motor M' shown diagrammatically in Fig. 3 is of the capacitor type having a main field winding MI' and an auxiliary field winding MFR. The main field winding is connected in series with a condenser MC, between supply conductors L¹ and L², which supplies alternating current voltage to the primary winding T¹ of the transformer T.

As a result of the action of the condenser MC, the current flowing in the winding MI' of Fig. 3, will lead the line voltage by approximately 90°. When the arm GF engages stud F before the arm GR engages the galvanometer pointer, the potential bias impressed on the grid Bf will create a pulsating current flow through the motor winding MFR, which will be displaced in phase from the current flow in the winding MI' by approximately 90° and as a result a rotating magnetic field will be established in the motor to produce rotation of the motor rotor in a predetermined direction. When the arm GR engages the galvanometer pointer G' before the arm GF engages the stud F, the potential bias impressed on the grid Br will create a pulsating current flow through the motor winding MFR, which will be displaced approximately 90° in phase from the current flow in the winding MI', but the direction of the phase displacement of the currents in the two windings will be opposite to that in the first mentioned case. As in the Fig. 1 arrangement, with either direction of the phase displacement of the current flow in the winding MFR relative to that in the winding MI', the two current flows will subject the rotor of the motor to a magnetic field rotating in a direction selectively dependent upon the direction of said displacement and produce a rotor rotation in the same direction in which the magnetic field rotates.

Notwithstanding the specific differences between the arrangements of Figs. 1 and 3, the two arrangements are alike in their more important novel characteristics. In each case, the main and auxiliary field windings of the induction motor are so combined with a pair of electron emission devices, that the rotor of the motor will be subjected to the action of a magnetic field rotating in one direction, or the other, accordingly as a signal or potential bias is impressed on the grid of one or the other of the two electronic devices. In each case, also, the simultaneous impression of signals or bias potentials of similar strengths on the grids of the two devices will prevent the magnetic field then formed from rotating.

As will be apparent to those skilled in the art, the arrangements illustrated and described for producing control effects varying in direction and magnitude with the position of a galvanometer pointer deflecting in accordance with variations in a variable condition, possess important practical advantages for control instrument use, because of their reliability and definite action, and because they contribute to instrument simplification, and particularly because of the simplicity, reliability and other desirable operating characteristics of motors of the rotating field type.

While in accordance with the provisions of the statutes I have illustrated and described preferred embodiments of the present invention, those skilled in the art will understand that changes may be made in the form of the apparatus disclosed without departing from the spirit of my invention as set forth in the appended claims, and that some features of the present invention may sometimes be used with advantage, without a corresponding use of other features.

Having now described my invention, what I claim as new and desire to secure by Letters Patent, is:

1. A control circuit for a reversible electrical rotating field motor having two windings inductively disposed with respect to a rotor, comprising a pair of electronic valves, each of said electronic valves including an anode, a cathode and a grid, means connecting the anode to cathode impedances of said valves in parallel, a source of voltage connected to said valves and to one of said field windings, a voltage source of varying magnitude connected to the other of said windings, and means for selectively applying on one grid a second voltage of varying magnitude displaced in phase relation from the first mentioned varying voltage and for selectively applying the first mentioned varying voltage on the other grid of said electronic valves.

2. A control circuit for a reversible electrical condenser motor having two field windings inductively disposed with respect to a rotor, comprising a pair of electronic emission devices, each of said electronic emission devices including an anode, a cathode and a grid, means connecting the anode to cathode impedances of said emission devices in parallel, a source of voltage connected to said emission devices and to one of said field windings, a voltage source of varying magnitude connected to the other of said windings, and means for selectively applying on one grid a second voltage of varying magnitude displaced in phase relation from the first mentioned varying voltage and for selectively applying the first mentioned varying voltage on the other grid of said electronic emission devices.

3. A control circuit for a reversible electrical shading pole motor having a main field winding and a plurality of shading field windings, comprising a pair of electronic emission devices, each of said electron emission devices including an anode, a cathode and a grid, means connecting the anode to cathode impedances of said emission devices in parallel, a source of voltage connected to said emission devices and to said shading field windings, a source of voltage of varying magnitude connected to said main field winding, and means for selectively applying on one grid a second voltage of varying magnitude displaced in phase relation from the first mentioned varying voltage and for selectively applying on the other grid of said electronic emission devices a varying voltage substantially similar in phase to the first mentioned varying voltage.

4. A control circuit for a reversible electrical rotating field motor having two windings inductively disposed with respect to a rotor, comprising a pair of electronic emission devices, each of said electronic emission devices including an anode, a cathode and a grid, a source of direct current voltage, a series connection between said source of voltage and one of said field windings including the anode to cathode impedances of said emission devices in parallel, a voltage source of varying magnitude connected to the other of said windings, and means for selectively applying on one grid a second voltage of varying magnitude displaced in phase relation from the first mentioned varying voltage and for selectively applying the first mentioned varying voltage on the other grid of said electronic emission devices.

THOMAS R. HARRISON.